United States Patent
Lin et al.

(10) Patent No.: US 9,747,107 B2
(45) Date of Patent: Aug. 29, 2017

(54) SYSTEM AND METHOD FOR COMPILING OR RUNTIME EXECUTING A FORK-JOIN DATA PARALLEL PROGRAM WITH FUNCTION CALLS ON A SINGLE-INSTRUCTION-MULTIPLE-THREAD PROCESSOR

(71) Applicant: Nvidia Corporation, Santa Clara, CA (US)

(72) Inventors: Yuan Lin, Santa Clara, CA (US); Gautam Chakrabarti, Santa Clara, CA (US); Jaydeep Marathe, Santa Clara, CA (US); Okwan Kwon, West Lafayette, IN (US); Amit Sabne, West Lafayette, IN (US)

(73) Assignee: Nvidia Corporation, Santa Clara, CA (US)

( * ) Notice: Subject to any disclaimer, the term of this patent is extended or adjusted under 35 U.S.C. 154(b) by 531 days.

(21) Appl. No.: 13/724,359

(22) Filed: Dec. 21, 2012

(65) Prior Publication Data

US 2014/0130052 A1    May 8, 2014

Related U.S. Application Data

(60) Provisional application No. 61/722,661, filed on Nov. 5, 2012.

(51) Int. Cl.
*G06F 9/38*  (2006.01)
*G06F 12/02* (2006.01)
(Continued)

(52) U.S. Cl.
CPC .................. *G06F 9/38* (2013.01); *G06F 8/40* (2013.01); *G06F 9/3851* (2013.01);
(Continued)

(58) Field of Classification Search
CPC .......... G06F 9/38; G06F 9/5016; G06F 12/02; G06F 9/52; G06F 9/522; G06F 8/40; G06F 9/3851
See application file for complete search history.

(56) References Cited

U.S. PATENT DOCUMENTS

| 5,875,464 | A |   | 2/1999  | Kirk |
|---|---|---|---|---|
| 5,978,838 | A | * | 11/1999 | Mohamed ........... G06F 9/30036 709/208 |

(Continued)

FOREIGN PATENT DOCUMENTS

| CN | 1725176   | A | 1/2006 |
|---|---|---|---|
| CN | 101176066 | A | 5/2008 |

(Continued)

OTHER PUBLICATIONS

Improving SIMT Efficiency of Global Rendering Algorithms with Architectural Support for Dynamic Micro-Kernels Zambreno et al., 2010.*

(Continued)

*Primary Examiner* — Benjamin Wu
(74) *Attorney, Agent, or Firm* — Kevin Brown; Parker Justiss, P.C.

(57) ABSTRACT

A system and method for compiling or runtime executing a fork-join data parallel program with function calls. In one embodiment, the system includes: (1) a partitioner operable to partition groups into a master group and at least one worker group and (2) a thread designator associated with the partitioner and operable to designate only one thread from the master group for execution and all threads in the at least one worker group for execution.

18 Claims, 2 Drawing Sheets

(51) Int. Cl.
  *G06F 9/45* (2006.01)
  *G06F 9/52* (2006.01)
  *G06F 9/50* (2006.01)
(52) U.S. Cl.
  CPC .............. *G06F 9/5016* (2013.01); *G06F 9/52* (2013.01); *G06F 9/522* (2013.01); *G06F 12/02* (2013.01)

(56) References Cited

U.S. PATENT DOCUMENTS

| | | | |
|---|---|---|---|
| 6,088,770 A | 7/2000 | Tarui et al. | |
| 6,389,449 B1* | 5/2002 | Nemirovsky | G06F 9/30123 712/228 |
| 6,574,725 B1* | 6/2003 | Kranich | G06F 9/30087 709/208 |
| 6,609,193 B1 | 8/2003 | Douglas et al. | |
| 7,086,063 B1 | 8/2006 | Ousterhout et al. | |
| 7,159,211 B2* | 1/2007 | Jalan | G06F 8/458 712/31 |
| 7,467,385 B2* | 12/2008 | Nemirovsky | G06F 9/4818 712/23 |
| 7,689,809 B2* | 3/2010 | Kranich | G06F 9/30043 712/244 |
| 7,856,541 B2 | 12/2010 | Kaneda et al. | |
| 8,161,483 B2* | 4/2012 | Barsness | G06F 9/4405 718/102 |
| 8,250,555 B1* | 8/2012 | Lee | G06F 8/445 717/132 |
| 8,335,892 B1 | 12/2012 | Minkin et al. | |
| 8,397,013 B1 | 3/2013 | Rosenband et al. | |
| 8,516,483 B2 | 8/2013 | Chinya et al. | |
| 8,528,001 B2* | 9/2013 | Song | G06F 9/485 718/104 |
| 8,547,385 B2 | 10/2013 | Jiao | |
| 8,561,046 B2* | 10/2013 | Song | G06F 8/456 717/161 |
| 8,595,726 B2* | 11/2013 | Park | G06F 9/52 718/100 |
| 8,612,978 B2* | 12/2013 | Damron | G06F 9/485 718/100 |
| 8,615,646 B2 | 12/2013 | Nickolls et al. | |
| 8,683,132 B1 | 3/2014 | Danilak | |
| 8,769,537 B1* | 7/2014 | Ruggiero | G06F 9/5027 718/100 |
| 8,914,799 B2* | 12/2014 | Lin | G06F 8/314 718/102 |
| 9,268,614 B2* | 2/2016 | Barsness | G06F 9/4405 |
| 9,436,475 B2* | 9/2016 | Chakrabarti | G06F 9/38 |
| 2002/0029357 A1 | 3/2002 | Charnell et al. | |
| 2003/0018684 A1 | 1/2003 | Ohsawa et al. | |
| 2005/0125774 A1 | 6/2005 | Barsness et al. | |
| 2006/0095675 A1 | 5/2006 | Yang et al. | |
| 2007/0136523 A1 | 6/2007 | Bonella et al. | |
| 2007/0143582 A1* | 6/2007 | Coon | G06F 3/3009 712/235 |
| 2007/0192541 A1 | 8/2007 | Balasubramonian et al. | |
| 2007/0294512 A1 | 12/2007 | Crutchfield et al. | |
| 2008/0052466 A1 | 2/2008 | Zulauf | |
| 2008/0126716 A1 | 5/2008 | Daniels | |
| 2009/0006758 A1 | 1/2009 | Chung et al. | |
| 2009/0013323 A1 | 1/2009 | May et al. | |
| 2009/0031290 A1 | 1/2009 | Feng et al. | |
| 2009/0100244 A1 | 4/2009 | Chang et al. | |
| 2009/0240930 A1* | 9/2009 | Barsness | G06F 9/4856 712/229 |
| 2009/0307703 A1* | 12/2009 | Archer | G06F 9/5027 718/104 |
| 2010/0079454 A1 | 4/2010 | Legakis et al. | |
| 2010/0281230 A1 | 11/2010 | Rabii et al. | |
| 2011/0022672 A1 | 1/2011 | Chang et al. | |
| 2011/0072214 A1 | 3/2011 | Li et al. | |
| 2011/0072438 A1 | 3/2011 | Fiyak et al. | |
| 2011/0125974 A1 | 5/2011 | Anderson | |
| 2011/0167416 A1* | 7/2011 | Sager | G06F 8/4442 717/149 |
| 2011/0191522 A1 | 8/2011 | Condict et al. | |
| 2011/0265068 A1 | 10/2011 | Elnozahy et al. | |
| 2011/0320804 A1 | 12/2011 | Chan et al. | |
| 2012/0072652 A1 | 3/2012 | Celis et al. | |
| 2012/0089792 A1 | 4/2012 | Fahs et al. | |
| 2012/0131309 A1 | 5/2012 | Johnson et al. | |
| 2012/0137055 A1 | 5/2012 | Lee et al. | |
| 2012/0137099 A1 | 5/2012 | Shibayama et al. | |
| 2012/0151179 A1 | 6/2012 | Gaertner et al. | |
| 2012/0191953 A1 | 7/2012 | Eichenberger et al. | |
| 2012/0204065 A1 | 8/2012 | Tsafrir et al. | |
| 2012/0254530 A1 | 10/2012 | Tagaya | |
| 2013/0198759 A1* | 8/2013 | Shah | G06F 9/4881 718/105 |
| 2013/0263153 A1 | 10/2013 | Gschwind | |
| 2014/0007114 A1 | 1/2014 | Wang et al. | |
| 2014/0129783 A1* | 5/2014 | Marathe | G06F 9/38 711/147 |
| 2014/0129812 A1 | 5/2014 | Chakrabarti et al. | |
| 2014/0130021 A1* | 5/2014 | Lin | G06F 9/38 717/136 |

FOREIGN PATENT DOCUMENTS

| | | |
|---|---|---|
| CN | 101819675 A | 9/2010 |
| TW | 201140447 A | 11/2011 |
| TW | 201220246 A | 5/2012 |

OTHER PUBLICATIONS

Dynamic Warp Subdivision for Integrated Branch and Memory Divergence Tolerance Skadron et al., Jun. 2010.*

Chen, Dehao, et al., "Tree Partition based Parallel Frequent Pattern Mining on Shared Memory Systems", IEEE, Apr. 25, 2066, 8 pages.

Thomas, McCarthy, et al., "The Very Basics of Garbage Collection," Aug. 26, 2008, 4 pages.

Reyes, Ruyman, et al., "accULL: An OpenACC Implementation with CUDA and OpenCL Support", 2012, 12 pages.

* cited by examiner

SYSTEM AND METHOD FOR COMPILING OR RUNTIME EXECUTING A FORK-JOIN DATA PARALLEL PROGRAM WITH FUNCTION CALLS ON A SINGLE-INSTRUCTION-MULTIPLE-THREAD PROCESSOR

CROSS-REFERENCE TO RELATED APPLICATION

This application claims the benefit of U.S. Provisional Application Ser. No. 61/722,661, filed by Lin, et al., on Nov. 5, 2012, entitled "Executing Sequential Code Using a Group of Threads," commonly assigned with this application and incorporated herein by reference.

TECHNICAL FIELD

This application is directed, in general, to parallel processors and, more specifically, to a system and method for compiling or runtime executing a fork-join data parallel program with function calls on a single-instruction-multiple-thread (SIMT) processor.

BACKGROUND

As those skilled in the pertinent art are aware, applications, or programs, may be executed in parallel to increase their performance. Data parallel programs carry out the same process concurrently on different data. Task parallel programs carry out different processes concurrently on the same data. Static parallel programs are programs having a degree of parallelism that can be determined before they execute. In contrast, the parallelism achievable by dynamic parallel programs can only be determined as they are executing. Whether the program is data or task parallel, or static or dynamic parallel, it may be executed in a pipeline which is often the case for graphics programs.

A SIMT processor is particularly adept at executing data parallel programs. A control unit in the SIMT processor creates groups of threads of execution and schedules them for execution, during which all threads in the group execute the same instruction concurrently. In one particular processor, each group, or "warp," has 32 threads, corresponding to 32 execution pipelines, or lanes, in the SIMT processor.

A fork-join data parallel program starts with a single-threaded main program. The program is in a sequential phase or region at this stage. At some point during the execution of the main program, the main, or "master," thread encounters a sequence of parallel phases or regions. Each parallel region has independent data set and can be executed by multiple threads concurrently. The number of concurrent tasks in each parallel region is determined when the parallel region starts and does not change during the parallel region. When a parallel region is encountered, the main thread forks a team of threads (called worker threads) to execute the parallel region in parallel. The program then enters the parallel region. If a worker thread encounters a new parallel region, the new parallel region will be serialized, i.e. the parallel region will be executed by the encountering worker thread itself. The master thread waits until the parallel region finishes. Upon exiting the parallel region, the worker threads join with the master thread, which then resumes the execution of the main program, at which point the program enters a sequential region.

Table 1, below, sets forth an example of a fork-join data parallel program.

TABLE 1

An Example of a Fork-join Data Parallel Program

```
extern ext( );
thread_main( )
{
    foo( );
    ext( );
    #pragma parallel loop
    for (...) {
        foo( );
        bar( );
    }
    #pragma parallel loop
    for (...) {
        ext( );
    }
    bar( );
}
bar( )
{
    #pragma parallel loop
    for (...) {
        ...
    }
}
foo( )
{
    ...
}
```

For purposes of understanding Table 1 and the remainder of this disclosure, the terms "foo" and "bar" are arbitrary names of functions. Any function can therefore be substituted for "foo" or "bar."

The fork-join data parallel model is commonly used in parallel programming. For example, the OpenMP standard adopts this model as its basic thread execution model. The OpenACC standard uses this model for the worker threads in a group called a "gang."

SUMMARY

One aspect provides a system for compiling or runtime executing a fork-join data parallel program with function calls. In one embodiment, the system includes: (1) a partitioner operable to partition warps into a master warp and at least one worker warp and (2) a thread designator associated with the partitioner and operable to designate only one thread from the master warp for execution and all threads in the at least one worker warp for execution.

Another aspect provides a method of compiling or runtime executing a fork-join data parallel program with function calls. In one embodiment, the method includes: (1) partitioning warps into a master warp and at least one worker warp and (2) designating only one thread from the master warp for execution and all threads in the at least one worker warp for execution.

BRIEF DESCRIPTION

Reference is now made to the following descriptions taken in conjunction with the accompanying drawings, in which.

DETAILED DESCRIPTION

Figure 1:
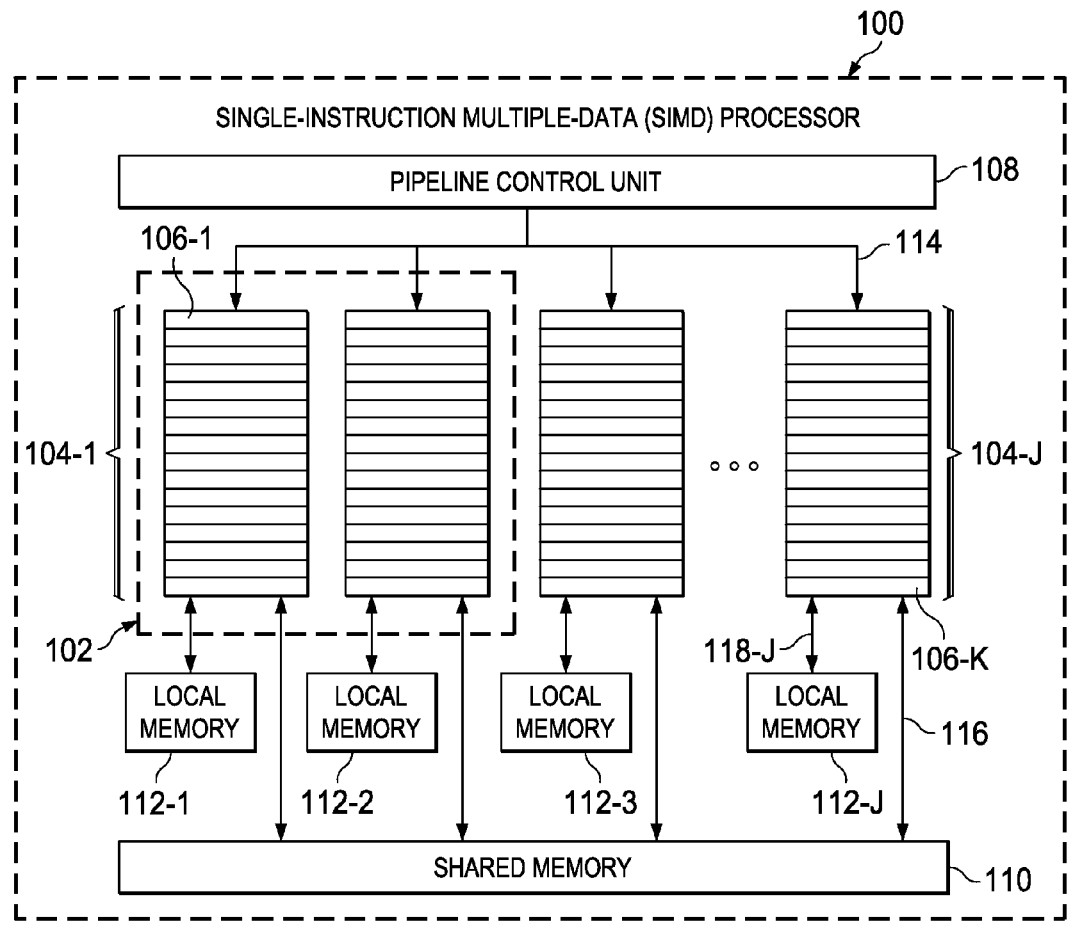
FIG. 1 is a block diagram of a SIMT processor operable to contain or carry out a system or method for compiling or runtime executing a fork-join data parallel program with function calls.

In a SIMT processor, multiple threads of execution are segregated into groups. All threads in the group execute the same instruction at the same time. In graphics processing units (GPUs) commercially available from Nvidia Corporation of Santa Clara, Calif., which are one type of SIMT processor, groups are called "warps," and they execute in blocks.

A pipeline control unit of the SIMT processor creates, manages, schedules, executes and provides a mechanism to synchronize groups. Nvidia GPUs provide a bar.sync instruction to synchronize groups. Nvidia GPUs also support execution of a "divergent" conditional branch by a group; some threads of the group need to take the branch (because the branch condition predicate evaluates to "true"), and other threads need to fall through to the next instruction (because the branch condition predicate evaluates to "false"). The pipeline control unit keeps track of active threads in the group. It first executes one of the paths (branch-taken or branch-not-taken) and then the other path; the appropriate threads are enabled on each path.

It is realized herein that, while all threads within a GPU thread block start at the same program address, the pipeline control unit would benefit from a software mechanism to partition and schedule the threads into the main thread and worker threads so that they can perform in the fork-join model.

It is further realized that certain embodiments of the software mechanism should manage and synchronize the threads by group, because the pipeline control unit manages threads by group.

It is yet further realized that since the main program is executed single-threaded in the fork-join model, certain embodiments of the software mechanism should achieve sequential region semantics without introducing side-effects. Examples of side-effect-causing instructions are those employing shared resources, such as a shared memory read or write or any code operation that may invoke a shared exception handler (e.g. division).

It is still further realized that certain embodiments of the software mechanism should support functions that may be called within the sequential region and within the parallel region. And such functions may contain parallel constructs themselves. It is still yet further realized that certain embodiments of the software mechanism should support function calls that can fork-join parallel regions.

It is yet still further realized that certain embodiments of the software mechanism should support foreign functions, namely functions that are not compiled by the same compiler as the program. For example, math functions in existing GPU math libraries, and system functions like malloc, free and print. In certain embodiments, the master thread in the sequential region and the worker threads in the parallel region should both be able to call a foreign function.

Accordingly, described herein are various embodiments of a system and method for compiling and executing fork-join data parallel programs with function calls on a SIMT processor such as a GPU.

Before describing certain embodiments of the system and method, a SIMT processor operable to contain or carry out a system or method for compiling or runtime executing fork-join data parallel programs with function calls will be described.

FIG. 1 is a block diagram of a SIMT processor 100. SIMT processor 100 includes multiple thread processors, or cores 106, organized into thread groups 104, or "warps." SIMT processor 100 contains J thread groups 104-1 through 104-J, each having K cores 106-1 through 106-K. In certain embodiments, thread groups 104-1 through 104-J may be further organized into one or more thread blocks 102. Certain embodiments include thirty-two cores 106 per thread group 104. Other embodiments may include as few as four cores in a thread group and as many as several tens of thousands. Certain embodiments organize cores 106 into a single thread group 104, while other embodiments may have hundreds or even thousands of thread groups 104. Alternate embodiments of SIMT processor 100 may organize cores 106 into thread groups 104 only, omitting the thread block organization level.

SIMT processor 100 further includes a pipeline control unit 108, block-shared memory 110 and an array of local memory 112-1 through 112-J associated with thread groups 104-1 through 104-J. Pipeline control unit 108 distributes tasks to the various thread groups 104-1 through 104-J over a data bus 114. Cores 106 within a thread group 106-j execute in parallel with each other. Thread groups 104-1 through 104-J communicate with block-shared memory 110 over a memory bus 116. Thread groups 104-1 through 104-J respectively communicate with local memory 112-1 through 112-J over local buses 118-1 through 118-J. For example, a thread group 104-J utilizes local memory 112-J by communicating over a local bus 118-J. Certain embodiments of SIMT processor 100 allocate a shared portion of block-shared memory 110 to each thread block 102 and allow access to shared portions of block-shared memory 110 by all thread groups 104 within a thread block 102. Certain embodiments include thread groups 104 that use only local memory 112. Many other embodiments include thread groups 104 that balance use of local memory 112 and block-shared memory 110.

The embodiment of FIG. 1 includes a master thread group 104-1. Each of the remaining thread groups 104-2 through 104-J are considered "worker" thread groups. The master thread group 104-1 includes numerous cores, one of which is a master core 106-1, which ultimately executes a master thread. Programs executed on SIMT processor 100 are structured as a sequence of kernels. Typically, each kernel completes execution before the next kernel begins. In certain embodiments, SIMT processor 100 may execute multiple kernels in parallel, depending on the size of the kernels. Each kernel is organized as a hierarchy of threads to be executed on the cores 106.

Having described a SIMT processor within which the system or method introduced herein may be contained or carried out, various embodiments of the system and method will be described.

One embodiment of the system introduced herein includes a compiler and a device runtime library. The device runtime library implements the thread and group management functionality. The compiler translates a fork-join data parallel program into a main thread program and a set of outlined functions, each corresponding to a parallel construct. The translated code makes calls to functions in the device runtime library to perform thread and group management.

Table 2, below, illustrates an example program to illustrate the compiler translation and the device runtime implementation.

TABLE 2

Example Program for Compiler Translation and Device
Runtime Implementation

```
extern ext( );
main( )
{
    foo( );
    ext( );
    #pragma parallel loop
    for (...) {
        foo( );
        bar( );
    }
    #pragma parallel loop
    for (...)   {
        ext( );
    }
    bar( );
}
bar( )
{
    Statements 1;
    #pragma parallel loop
    for (...) {
        bar_par_body;
    }
    Statement 2;
}
foo( )
{
    foo_body;
}
```

The flow of the main( ) program of Table 2 begins with the single master thread. The master thread calls function foo( ) having a body visible to and compiled by this compiler. The master thread then calls a function ext( ) an extern, or foreign, function having a body invisible to this compiler. Calls to foreign functions are translated as is, without any special handling by the compiler. The master thread then encounters the first parallel region. Worker threads will execute the parallel region while the master thread waits for their completion. Within the parallel region, each worker thread calls function foo( ) and bar( ) Function bar( ) contains another parallel region; however, bar( ) is already inside a parallel region. Because bar( ) is already inside a parallel region, the parallel region inside bar( ) will be executed sequentially by each worker thread.

After the first parallel region, the master thread encounters a second parallel region. Within the second parallel region, each worker thread calls the external foreign function ext( ). After the second parallel region, the master thread calls function bar( ). Within bar( ) the master thread encounters a third parallel region that will again be executed by the worker threads.

The function main( ) is known as an entry function because, it is where the program starts. Functions such as foo( ) and bar( ) are non-entry functions.

For an entry function, the compiler first makes a cloned copy that is named main_core( ). The cloned copy is then processed as a non-entry function as described below. For the main( ) function, the compiler generates code like that shown in Table 3, below, where groupID( ) returns the ID of the thread group containing a thread executing the statement. threadID( ) returns the ID of the thread. init( ), signal_done( ) and scheduler( ) are functions in the device runtime library.

TABLE 3

Example Compiler-Generated Code

```
main( )
{
    if (groupID( ) == 0) {
        if (threadID( ) == 0) {
            init( );
            main_core( );
            signal_done( );
        }
    }
    else
        scheduler( );
}
```

When a GPU thread block starts, all threads within the block execute main( ); however, they take different paths. Thread 0 is the master thread and executes init( ), main_core( ) and signal_done( ). Other threads within group 0 go straight to the end of the main( ) function and wait there. The threads in remaining groups execute scheduler( ).

For a non-entry function, like foo( ), bar( ) and main_core( ), the compiler translates the code as if no parallel construct exists. If a non-entry function contains a parallel construct, then for each parallel construct, the compiler creates a function containing the body of the parallel construct (an outlined function), and then creates a conditional branch that checks if the executing thread is the master thread. In the false branch, the compiler inserts code that executes the loop. In the true branch, the compiler inserts calls to the device runtime library to assign task, wake-up worker threads, and executes a barrier. The condition is true when the non-entry function is called outside the parallel regions. The condition is false when the non-entry function is called within a parallel region, in which case the parallel loop is executed sequentially by the executing thread.

For example, the translated code for function bar( ) is shown below in Table 4.

TABLE 4

Translated Code for the Function Bar( )

```
bar( )
{
    Statements 1;
    if (groupID( ) == 0 && threadID( ) == 0)   {
        signal_task(bar_par_func);
        barrier( );
    }
    else {
        for (...) {
            bar_par_body( );
        }
    }
    Statements 2;
}
bar_par_func( )
{
    for (...) { // with loop iteration partitioned among the
                // worker threads
        bar_par_body;
    }
}
```

Signal_task( ) and barrier( ) are functions in the device runtime library. bar_par_frunc( ) is the outlined function corresponding to the parallel construct in the original function bar( ).

In this embodiment, the device runtime library includes the following functions, among others: init( ) scheduler( ), signal_task( ), signal_done( ), and barrier( ). The library also implements the following functions for internal use: signal( ), wait( ), and fetch_task( ).

All worker threads execute the scheduler( ) function. The worker threads go through a sleep-wake-execute cycle until being instructed to exit.

TABLE 5

Example Code Using Program Exit Flag

```
shared bool exit_flag ;
scheduler( )
{
    while (1) {
        wait( );
        if (exit_flag)
            return;
        }
        task = fetch_task( );
        task( );
        barrier( );
    }
}
```

A Boolean variable 'exit_flag' is put in block-shared memory and can be accessed by all threads within the thread block. It is used to by the master thread to communicate to the worker threads whether they should all exit the execution. The 'exit_flag' is set to false in the init( ) function, and is set to true in the signal_done( ) function. Both functions are called by the master thread.

TABLE 6

Example Code for Changing Program Exit Flag Stage

```
init( )
{
    exit_flag = false;
}
signal_done( )
{
    exit_flag = true;
    signal( );
}
```

Another piece of block-shared memory is used to communicate the current task. The current task is set by the master thread in the signal_task( ) function, and fetched by the worker thread in the fetch_task( ) function. The block-shared memory contains the pointer to the outlined function corresponding to the parallel construct.

TABLE 7

Example Code for Using a Pointer to Identify a Current Task

```
shared function_ptr task;
signal_task(function_ptr a_task)
{
    task = a_task;
    signal( );
}
fetch_task( )
{
    return task;
}
```

Because the parallel regions are executed in sequence within a thread block, only one task is active at any moment. If the parallel regions can be executed asynchronously, a more complicated data structure such as a stack, a queue or a tree is typically needed to store the active tasks.

Barrier( ), signal( ) and wait( ) functions are implemented using a hardware barrier.

TABLE 8

Example Barrier( ), Signal( ) and Wait( ) Functions

```
barrier( )
{
    bar.sync;
}
wait( )
{
    bar.sync;
}
signal( )
{
    bar.sync;
}
```

Figure 2:
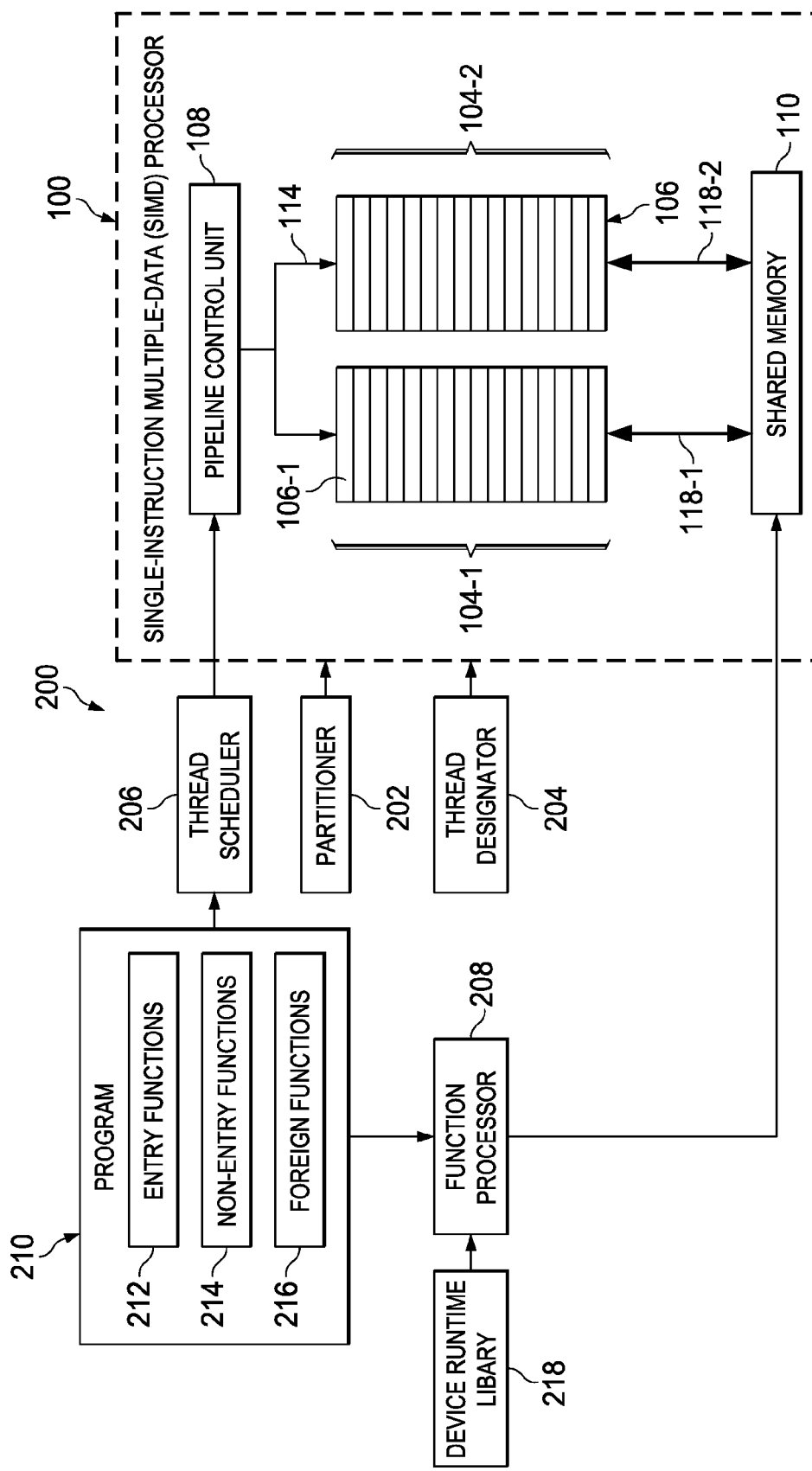
FIG. 2 is a block diagram of one embodiment of a system for compiling or runtime executing a fork-join data parallel program with function calls.

FIG. 2 is a block diagram of one embodiment of a system 200 for compiling or runtime executing a fork-join data parallel program 210 with function calls. Program 210 includes entry functions 212, non-entry functions 214 and foreign functions 216. System 200 includes a partitioner 202, a thread designator 204, a thread scheduler 206, a function processor 208, a device runtime library 218 and a SIMT processor 100, of FIG. 1.

SIMT processor 100 includes pipeline control unit 108, data bus 114, local buses 118-1 and 118-2 and shared memory 110 of FIG. 1. In the embodiment of FIG. 2, SIMT processor 100 is illustrated as having a single thread block containing two thread groups: master thread group 104-1 and worker thread group 104-2. Each of the thread groups 104-1 and 104-2 contains threads 106.

Partitioner 202 designates thread group 104-1 as the master thread group and the remaining thread groups as worker thread groups. In the embodiment of FIG. 2, a single worker thread group, 104-2, is illustrated. In alternate embodiments, many worker thread groups may be employed. Thread designator 204 designates a master thread 106-1 of the master thread group 104-1. All other threads in master thread group 104-1 are effectively idle. Thread designator 204 also designates each of the threads 106 in worker thread group 104-2 as worker threads.

Thread scheduler 206 translates program 210 such that pipeline control unit 108 controls execution of the master thread 106-1 and various worker threads in worker thread group 104-2 appropriately. Thread scheduler 206 translates program 210 such that when master thread execution begins, a program exit flag is disabled. Thread scheduler 206 schedules the master thread 106-1 to execute until reaching a parallel region or the end of program 210. When a parallel region of program 210 is reached, thread scheduler 206 sets a parallel task and worker threads in worker thread group 104-2 begin executing. Thread scheduler 206 also sets a barrier for each of the worker threads such that when the barrier is entered, master thread 106-1 execution resumes. When the end of program 210 is reached, the program exit flag is enabled causing all worker threads to cease execution.

Function processor 208 operates on the functions of program 210. Processing entry functions 212 includes creating a clone copy of an entry function that is then processed as a non-entry function. The original entry function is processed such that the master thread 106-1 will execute the clone copy, among other calls, and the worker threads will execute cycles of sleeping, waking, fetching and executing the parallel task set by thread scheduler 206.

Function processor 208 translates non-entry functions 214 in two ways. If no parallel construct exists in a non-entry function, then the function is simply processed as-is. When a parallel construct exists, an outlined function containing the body of the parallel construct is created. Function processor 208 then creates a branch condition that will either execute the parallel construct sequentially or employ the device runtime library 218 to assign a task, wake-up worker threads and execute a barrier, as described above. The wake-up and sleep functionality are implemented by using hardware barrier functions of the runtime device library 218. Threads at barriers are not scheduled for execution by the hardware so they do not waste execution cycles. Within the master thread group 104-1, only the master thread 106-1 participates in barriers. This is so because the hardware barrier is group-based. A group is considered to be at the barrier if any thread within the group is at the barrier.

Similar to processing non-entry functions having no parallel construct, foreign functions 216 are processed as-is by function processor 208.

A fork-join data parallel program is partitioned into a master program and a set of parallel tasks. The master program is the program that will be executed by the main thread. A parallel task corresponds to a parallel region that is executed by the worker threads. The master program contains scheduling points where the master thread will assign a parallel task, wake up the worker threads, and wait for the worker threads to complete.

The dedicated master thread in the dedicated master group will be executing the sequential region of the program.

Alternatively, single-thread behavior can be emulated in the sequential region while all threads in the group are executing the code. However, emulation schemes have both performance and engineering complexity limitations making them less usable. The necessary predication and synchronization introduces execution overhead. Additionally, all functions that may be called from both the sequential region and the parallel region need to be cloned and compiled differently.

Given the thread and group partition, worker threads and the master thread assume the following life cycles:

One embodiment of a worker thread goes through following stages in a life cycle:
1) Thread block starts;
2) Sleep until being woken up by the master thread;
3) Exit if the program exit flag is set to true;
4) Fetch and execute the task assigned by the master thread;
5) Enter a barrier; and
6) Go back to stage 2.

One embodiment of a master thread goes through following stages in a life cycle:
1) Thread block starts;
2) Set the program exit flag to false;
3) Execute the master program until reaches a parallel region or reach the end of the master program;
4) At the beginning of a parallel region:
a. Set a parallel task,
b. Wake up the worker threads,
c. Enter a barrier, and
d. Resume the master program (stage 3); and
5) At the end the master program:
a. Set the program exit flag to true,
b. Wake up the worker threads, and
c. Exit.

The other threads in the master group are essentially waiting at the end of the program, idling. The program is executed interleaved by the master thread and the worker threads. This results in a good instruction cache foot-print that is better than the foot-print produced by a method where both the master thread and the worker threads are active and executing different code path.

Figure 3:
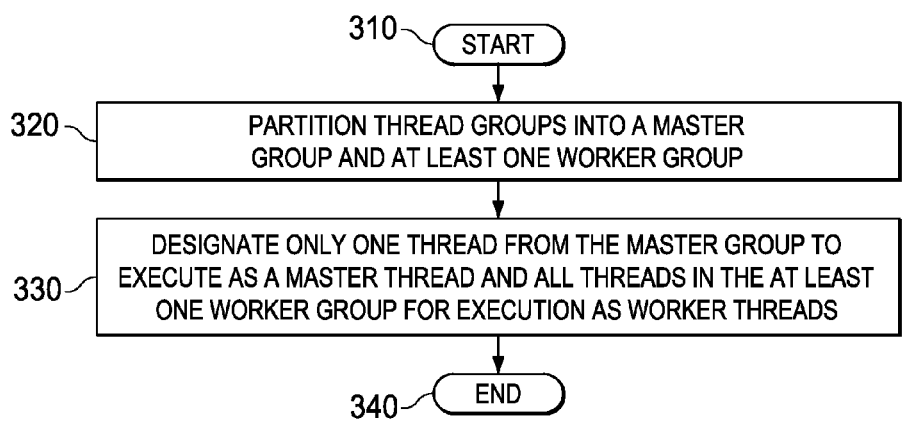
FIG. 3 is a flow diagram of one embodiment of a method of compiling or runtime executing a fork-join data parallel program with function calls.

FIG. 3 is a flow diagram of one embodiment of a method of compiling or runtime executing a fork-join data parallel program with function calls. The method begins in a start step 310. At a step 320, thread groups within a thread block are partitioned into a master thread group and at least one worker thread group. At a step 330, one thread from the master thread group is designated the master thread. The remaining threads of the master group are essentially idle throughout execution. Also at step 330, all threads in the at least one worker thread group are designated as worker threads. The method ends at an end step 340.

Those skilled in the art to which this application relates will appreciate that other and further additions, deletions, substitutions and modifications may be made to the described embodiments.

What is claimed is:

1. A system for compiling or runtime executing a fork-join data parallel program with function calls, comprising:
a single-instruction-multiple-thread (SIMT) processor including a pipeline control unit;
a partitioner implemented in software operable to partition any thread groups of said SIMT processor into a master group and at least one worker group prior to said compiling or said runtime executing of said fork-join data parallel program; and
a thread designator implemented in software associated with said partitioner and operable to designate any one thread from said master group for execution as master thread and all threads in said at least one worker group for execution as worker threads prior to said compiling or said runtime executing of said fork-join data parallel program;
wherein:
said master thread of said master group operates during a sequential phase of said fork-join data parallel program running on said SIMT processor;
said worker threads of said at least one worker group operate during a parallel phase of said fork-join data parallel program running on said SIMT processor;
said master thread waiting until said parallel phase is complete; and
other threads of said master group remaining idle during said fork-join data parallel program; and
said system is operable to configure shared memory of said SIMT processor to identify a current task.

2. The system as recited in claim 1 further comprising a thread scheduler implemented in software associated with said thread designator and operable to cause said pipeline control unit of said SIMT processor to schedule execution of said master thread, wherein during execution of said master thread:
a program exit flag is set to a first state when said master thread begins execution;
said master thread executes until reaching a parallel region or an end of said program;
upon reaching said parallel region, a parallel task is set, a first barrier is entered, a second barrier is entered and execution of said master thread is resumed; and
upon reaching said end, said program exit flag is set to a second state, a barrier is entered and said master thread ceases execution.

3. The system as recited in claim 1 further comprising a thread scheduler implemented in software associated with said thread designator and operable to cause said pipeline control unit of said SIMT processor to schedule execution of said worker threads, wherein during execution of said worker threads:
   said worker threads enter a first barrier;
   said worker threads begin execution of a parallel task set by said master thread when said master thread reaches a parallel region and said master thread enters a barrier;
   said worker threads enter a second barrier upon completion of said parallel task; and
   said worker threads exit if a program exit flag is set to a second state and said master thread enters a barrier.

4. The system as recited in claim 1 further comprising a thread scheduler implemented in software associated with said thread designator and operable to employ a barrier function of said pipeline control unit of said SIMT processor to control execution and cessation of said worker threads.

5. The system as recited in claim 1 further comprising a function processor implemented in software associated with said thread designator and operable to create a cloned copy of an entry function and, process said entry function as a non-entry function.

6. The system as recited in claim 1 further comprising a function processor implemented in software associated with said thread designator and operable to translate a non-entry function having a parallel construct by:
   creating a function containing a body of said parallel construct; and
   inserting calls to a device runtime library if said function is executing within said master thread.

7. The system as recited in claim 1 further comprising a function processor implemented in software associated with said thread designator and operable to translate calls to foreign functions as-is.

8. The system as recited in claim 1 further comprising a function processor implemented in software associated with said thread designator and operable to employ a device runtime library that provides functions that can be called from compiled user code and internal functions.

9. The system as recited in claim 1 further comprising a function processor implemented in software associated with said thread designator and operable to employ an exit flag stored in the shared memory and employed to allow said master thread to communicate to said worker threads when they should cease execution.

10. A method of compiling or runtime executing a fork-join data parallel program with function calls, comprising:
    partitioning any thread groups of a single-instruction, multiple-thread (SIMT) processor into a master group and at least one worker group prior to said compiling or said runtime executing of said fork-join data parallel program; and
    designating any one thread from said master group for execution as a master thread and all threads in said at least one worker group for execution as worker threads prior to said compiling or said runtime executing of said fork-join data parallel program; and
    configuring shared memory of said SIMT processor to identify a current task;

wherein:
    said master thread of said master group operates during a sequential phase of said fork-join data parallel program running on said SIMT processor;
    said worker threads of said at least one worker group operate during a parallel phase of said fork-join data parallel program running on said SIMT processor;
    said master thread waiting until said parallel phase is complete; and
    other threads of said master group remaining idle during said fork-join data parallel program.

11. The method as recited in claim 10 further comprising causing a pipeline control unit of said SIMT processor to schedule execution of said master thread, wherein during execution of said master thread:
    a program exit flag is set to a first state when said master thread begins execution;
    said master thread executes until reaching a parallel region or an end of said fork-join data parallel program;
    upon reaching said parallel region, a parallel task is set, a first barrier is entered, a second barrier is entered and execution of said master thread is resumed; and
    upon reaching said end, said program exit flag is set to a second state, a barrier is entered and said master thread ceases execution.

12. The method as recited in claim 10 further comprising causing a pipeline control unit of said SIMT processor to schedule execution of said worker threads, wherein during execution of said worker threads:
    said worker threads enter a barrier;
    said worker threads begin execution of a parallel task set by said master thread when said master thread reaches a parallel region and said master thread enters a barrier;
    said worker threads enter a second barrier upon completion of said parallel task; and
    said worker threads exit if a program exit flag is set to a second state and said master thread enters a barrier.

13. The method as recited in claim 10 further comprising employing a barrier function of a pipeline control unit of said SIMT processor to control execution and cessation of said worker threads.

14. The method as recited in claim 10 further comprising creating a cloned copy of an entry function and, process said entry function as a non-entry function.

15. The method as recited in claim 10 further comprising translating a non-entry function having a parallel construct by:
    creating a function containing a body of said parallel construct; and
    inserting calls to a device runtime library if said function is executing within said master thread.

16. The method as recited in claim 10 further comprising translating calls to foreign functions as-is.

17. The method as recited in claim 10 further comprising employing a device runtime library that provides functions that can be called from compiled user code and internal functions.

18. The method as recited in claim 10 further comprising employing an exit flag stored in the shared memory and employed to allow said master thread communicate to said worker threads when they should cease execution.

* * * * *